(12) United States Patent
Cheng et al.

(10) Patent No.: US 11,901,791 B2
(45) Date of Patent: Feb. 13, 2024

(54) ELECTRONIC DEVICE AND FUNCTIONAL MODULE THEREOF

(71) Applicant: ASUSTeK COMPUTER INC., Taipei (TW)

(72) Inventors: Chia-Min Cheng, Taipei (TW); Chui-Hung Chen, Taipei (TW); Ching-Yuan Yang, Taipei (TW); Cheng-Han Chung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 339 days.

(21) Appl. No.: 17/168,220

(22) Filed: Feb. 5, 2021

(65) Prior Publication Data

US 2021/0265890 A1 Aug. 26, 2021

(30) Foreign Application Priority Data

Feb. 21, 2020 (TW) .................. 109201989

(51) Int. Cl.
*H02K 5/04* (2006.01)
*H02K 7/00* (2006.01)
*H02K 7/116* (2006.01)
*H04M 1/02* (2006.01)

(52) U.S. Cl.
CPC .............. *H02K 5/04* (2013.01); *H02K 7/003* (2013.01); *H02K 7/116* (2013.01); *H04M 1/0202* (2013.01)

(58) Field of Classification Search
CPC .......... H02K 5/04; H02K 7/003; H02K 7/116; H04M 1/0202
USPC ........................................ 310/68 R
See application file for complete search history.

(56) References Cited

U.S. PATENT DOCUMENTS

| 6,003,395 | A | 12/1999 | Rogg |
| 6,327,927 | B1 | 12/2001 | Rogg |
| 9,182,070 | B2 | 11/2015 | Shannahan |
| 10,527,218 | B2 | 1/2020 | Shannahan |
| 2010/0020182 | A1* | 1/2010 | Wang ............... G03B 17/00 348/207.1 |

FOREIGN PATENT DOCUMENTS

| CN | 2857081 Y | 1/2007 | |
| CN | 106899112 | * 1/2020 | .............. H02K 5/04 |
| KR | 100564448 B1 | 3/2006 | |
| KR | 101867790 B1 | 6/2018 | |
| TW | I349845 B | 10/2011 | |

* cited by examiner

*Primary Examiner* — Terrance L Kenerly
(74) *Attorney, Agent, or Firm* — McClure, Qualey & Rodack, LLP

(57) ABSTRACT

A functional module is provided. The functional module is applied to an electronic device, and includes a housing, a functional member, and a motor assembly. Both the functional member and the motor assembly are disposed in the housing. The motor assembly includes a motor and an output shaft. The motor is configured to drive the output shaft to rotate. The output shaft protrudes from one side of the housing.

8 Claims, 4 Drawing Sheets

ELECTRONIC DEVICE AND FUNCTIONAL MODULE THEREOF

CROSS-REFERENCE TO RELATED APPLICATION

This application claims the priority benefit of Taiwan Application Serial No. 109201989, filed on Feb. 21, 2020. The entirety of the above-mentioned patent application is hereby incorporated by reference herein and made a part of specification.

BACKGROUND OF THE INVENTION

Field of the Invention

The disclosure provides an electronic device and a functional module thereof.

Description of the Related Art

Smartphones are designed with full-screens nowadays. And the internal space of the smartphone is thus decreased. Therefore, functional modules disposed in the internal space of the smartphones needs to be miniaturized.

BRIEF SUMMARY OF THE INVENTION

According to the first aspect, a functional module applied to an electronic device is provided. The functional module includes: a housing; a functional member, disposed in the housing; and a motor assembly, disposed in the housing and comprising a motor and an output shaft, the motor is configured to drive the output shaft to rotate, and the output shaft protrudes from one side of the housing.

According to the second aspect, an electronic device including a body and a functional module is provided. The functional module is disposed on the body and includes a housing, a functional member, and a motor assembly. The functional member and the motor assembly are disposed in the housing. The motor assembly includes an output shaft. The output shaft protrudes from one side of the housing and is fixedly connected to the body to drive the functional module to rotate relative to the body.

The functional module in the disclosure is accompanied with the motor assembly to drive the functional module to rotate. Compared with an conventional approach of driving the functional module to rotate by an external motor, the approach disclosed herein decreases the number of gear sets for the motor assembly, and avoids the backlash accumulation while saving the space and reducing production costs, so that the functional module is smoothly overturned.

BRIEF DESCRIPTION OF THE DRAWINGS

To make the objectives, features, advantages, and embodiments of the disclosure, including those mentioned above and others, more comprehensible, descriptions of the accompanying drawings are provided as follows.

DETAILED DESCRIPTION OF THE EMBODIMENTS

Figure 1:
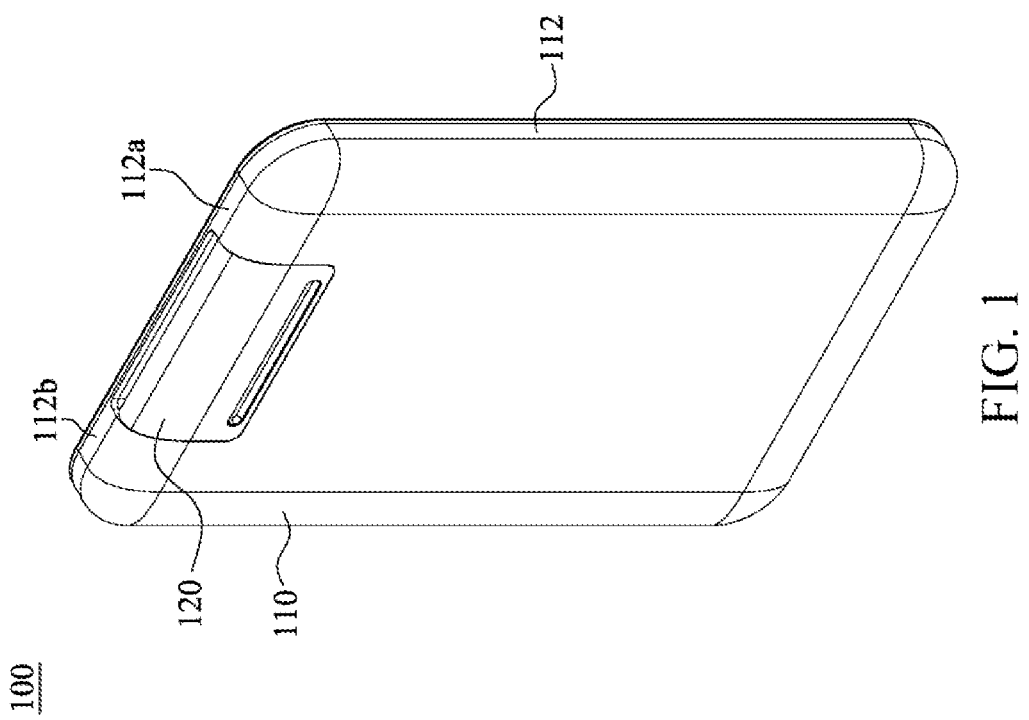
FIG. 1 and FIG. 2 are three-dimensional diagrams of an electronic device in two different operating states according to an embodiment of the disclosure.

To make the description of the disclosure more detailed and complete, reference is made to the accompanying drawings and various embodiments described below. Various elements in the drawings are not drawn in proportion, and are provided merely to illustrate the disclosure. To provide full understanding of the disclosure, various practical details are described below. However, a person of ordinary skill in the related art understands that the disclosure is implemented without one or more of the practical details. Therefore, the details are not used to limit the disclosure.

Figure 2:
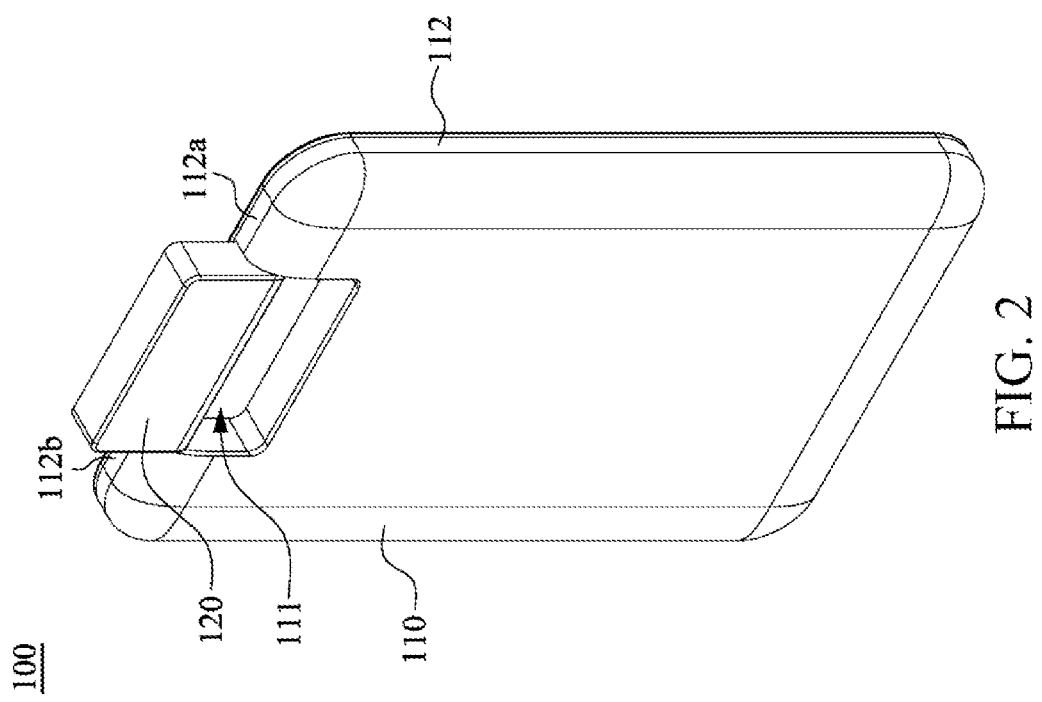

Referring to FIG. 1 and FIG. 2, an electronic device 100 includes a body 110 and a functional module 120. A groove 111 is provided at one side of the body 110. The functional module 120 is rotatably disposed on the body 110, and the functional module 120 is received in the groove 111. In an embodiment, the functional module 120 rotates between a first position (as shown in FIG. 1, the functional module 120 is located in the groove 111) and a second position (as shown in FIG. 2, the functional module 120 extends to one side of the body 110). In an embodiment, the functional module 120 includes an image capturing device for providing functions such as taking pictures and photographing. In an embodiment, the functional module 120 is used as a rear lens when being located at the first position, and the functional module 120 is used as a front lens when being located at the second position.

Figure 3:
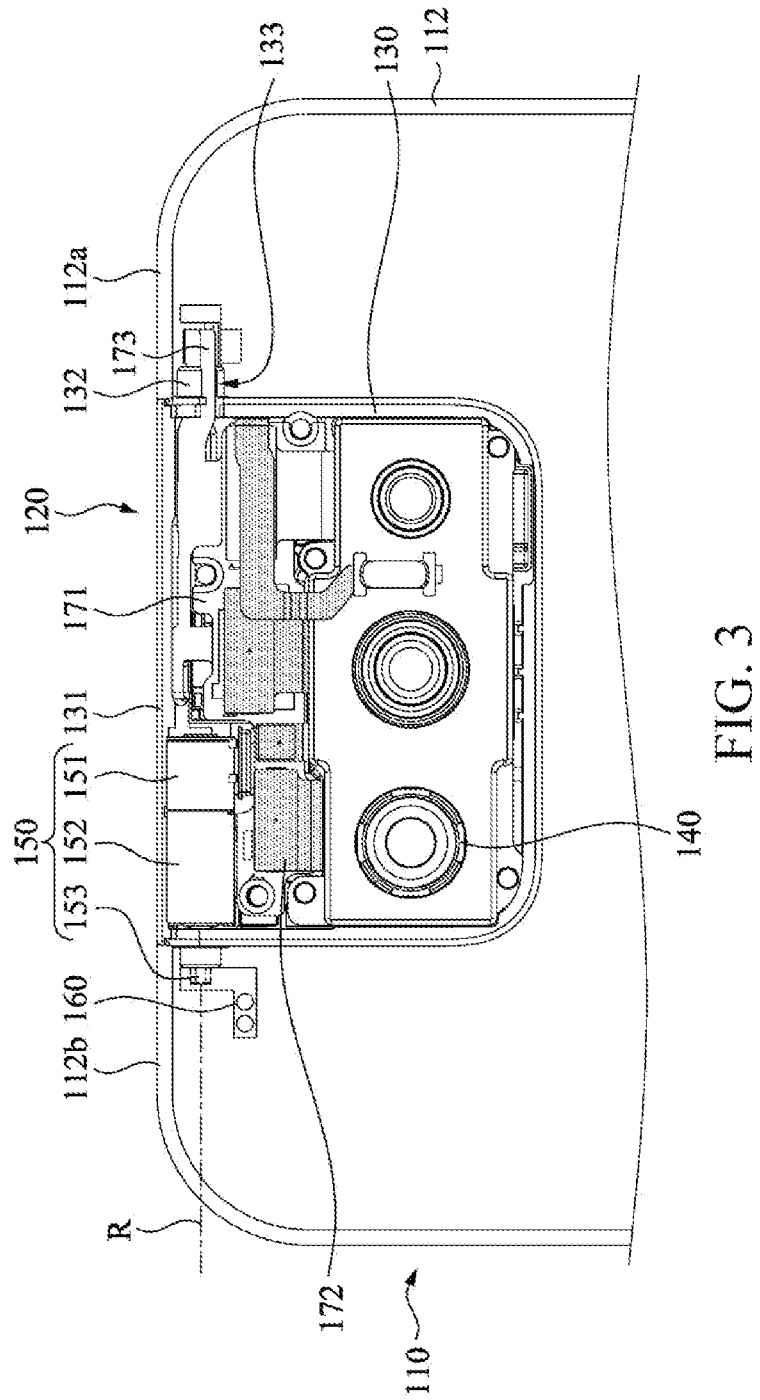
FIG. 3 is a rear perspective view of the electronic device shown in FIG. 1.

Referring to FIG. 3, the functional module 120 includes a housing 130, a functional member 140, and a motor assembly 150. In an embodiment, the housing 130 bears the functional member 140, the motor assembly 150, and other related parts and assemblies. The functional member 140 is disposed in the housing 130 and includes an image capturing device with a photosensitive element and a lens, a flash light, a loudspeaker, or a receiver for taking pictures, photographing, or playing/recording voice. The motor assembly 150 is also disposed in the housing 130. In some embodiments, the body 110 includes a frame 112 (also referring to FIG. 1 and FIG. 2). The frame 112 extends on an outer edge of the body 110 and includes straight sections 112a and 112b. The straight sections 112a and 112b are located at both sides of the groove 111. The housing 130 includes an edge 131 substantively collinear with the straight sections 112a and 112b. The motor assembly 150 is disposed at a side of the housing 130 close to the edge 131. The functional member 140 is arranged at a side of the motor assembly 150 away from the edge 131 (that is, the functional member 140 is disposed at the side of the housing 130 away from the edge 131). In an embodiment, the straight sections 112a and 112b are located on a short side of the body 110.

As shown in FIG. 3, the motor assembly 150 includes a motor 151, a power transfer module 152, and an output shaft 153. The motor 151 is a power source. The power transfer module 152 is connected between the motor 151 and the output shaft 153, to transfer an output of the motor 151 to the output shaft 153. In some embodiments, the power transfer module 152 is a gear box.

As shown in FIG. 3, the output shaft 153 protrudes from one side of the housing 130 and is fixedly connected to the body 110, so that the motor 151 drives the functional module 120 to rotate relative to the body 110. Specifically, the motor 151 includes two parts (that is, a stator/rotor) which rotate relative to each other, and the two parts are respectively connected to the output shaft 153 and the housing 130. When the functional module 120 is not mounted on the body 110, the output shaft 153 is driven by the motor 151 to freely rotate relative to the housing 130. In other words, one part of the motor 151 connected to the housing 130 serves as the stator, and another part of the motor 151 connected to the output shaft 153 serves as the rotor. However, when the functional module 120 is mounted on the body 110, since the output shaft 153 is fixed on the body 110 and does not rotate, the part of the motor 151 connected to the housing 130 rotates. Therefore, the housing 130 rotates about the output shaft 153 to achieve the rotating function of the functional module 120.

The functional module 120 in the disclosure includes the motor assembly 150 to drive the functional module 120 to rotate. Since the motor assembly 150 is not disposed in the body 110, the configuration of the motor assembly 150 is not limited by the frame 112 of the body 110. Therefore, the transmission path is shortened, the number of gear sets required for the power transfer module 152 is decreased, and the backlash accumulation problem is also solved while saving the space and reducing production costs, so that the functional module 120 is smoothly flipped. In addition, the functional module 120 with the motor assembly 150 is an independent rotation module, which facilitates simplifying the assembly and test procedures of the electronic device 100.

As shown in FIG. 3, in some embodiments, the electronic device 100 further includes a shaft sleeve 160 disposed on the body 110 (in an embodiment, the shaft sleeve 160 is fastened on the body 110 by a screw), and is fixedly sleeved on the section where the output shaft 153 protrudes from the left side of the housing 130 to fix the output shaft 153 on the body 110. In some embodiments, the output shaft 153 is connected to the housing 130 by a bearing (not shown), so that the housing 130 rotates relative to the output shaft 153 fixed on the body 110.

As shown in FIG. 3, when the functional module 120 is not mounted on the body 110, the output shaft 153 is driven by the motor 151 to rotate about an axis R. The axis R extends through the output shaft 153. When the functional module 120 is mounted on the body 110, the output shaft 153 is disabled to rotate because it is fixed on the body 110, and therefore, the housing 130 rotates about the axis R relative to the body 110.

As shown in FIG. 3, in some embodiments, the motor 151, the power transfer module 152, and the output shaft 153 are linearly arranged along the axis R. In some embodiments, the axis R is substantively parallel to the edge 131 of the housing 130. The motor 151, the power transfer module 152, and the output shaft 153 are linearly arranged along the edge 131 of the housing 130. When the motor assembly 150 is disposed close to the edge 131 of the housing 130 and the edge 131 is aligned with the frame 112, the space required for rotating the functional module 120 is reduced, so that the groove 111 can be designed to be smaller, thereby facilitating thinning the electronic device.

Figure 4:
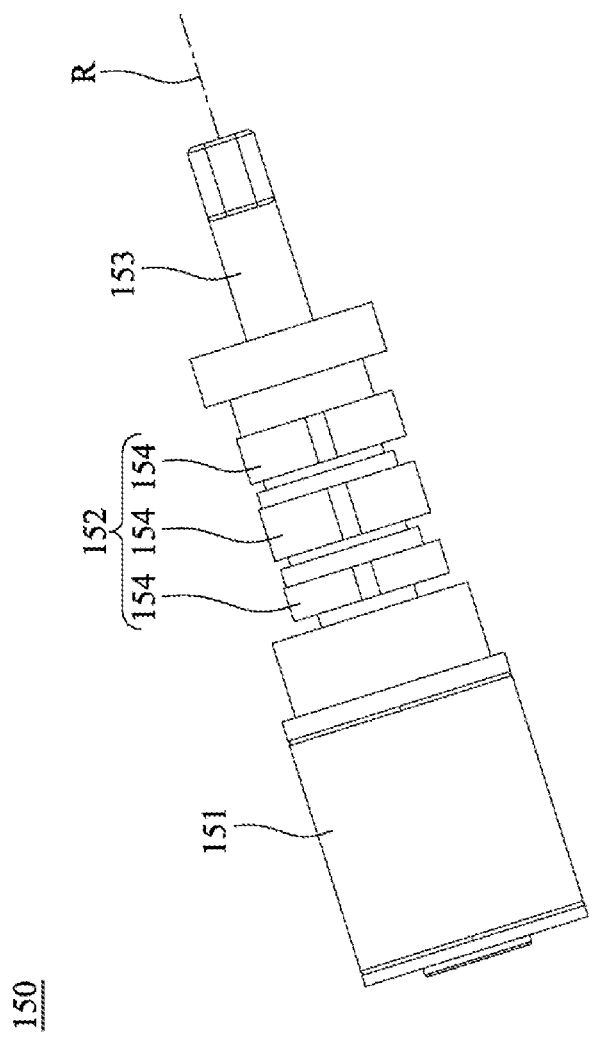
FIG. 4 is an enlargement view of a motor assembly of the electronic device shown in FIG. 3, and illustrates an internal structure of a power transfer module of the motor assembly.

As shown in FIG. 3, in some embodiments, the functional module 120 further includes a circuit board 171 disposed in the housing 130 and located between the functional member 140 and the motor assembly 150. The motor 151 and the functional member 140 are electrically connected to the circuit board 171 by a cable 172 (such as a flexible printed circuit). The circuit board 171 is electrically connected to other electronic elements (such as various processors or controllers; not shown) inside the body 110 by an external circuit 173. In some embodiments, the housing 130 includes a shaft portion 132. The shaft portion 132 is located at the side of the housing 130 opposite to the output shaft 153 of the motor assembly 150, and the shaft portion 132 is rotatably connected to the body 110. In addition, the shaft portion 132 includes an opening 133 for allowing the external circuit 173 to pass through to extend into the body 110.

please refer to FIG. 4, in some embodiments, the power transfer module 152 is a transmission and includes a plurality of planetary gear sets 154 (three planetary gear sets are taken as an example in FIG. 4, but not limit to the disclosure) for adjusting an output torque of the output shaft 153. In some embodiments, the planetary gear sets 154 are linearly arranged at an inner side of the edge 131 of the housing 130 along the axis R.

In conclusion, the functional module in the disclosure is provided with the motor assembly to drive the functional module to rotate. Compared with the approach of driving the functional module to rotate using an external motor, the above-mentioned approach decreases the number of gear sets required for the motor assembly, and also solves the backlash accumulation problem while saving the space and reducing production costs, so that the functional module is smoothly overturned.

What is claimed is:

1. A functional module, applied to an electronic device, and comprising:
    a housing;
    a functional member, disposed in the housing; and
    a motor assembly, disposed in the housing and comprising a motor and an output shaft, the motor is configured to drive the output shaft to rotate, and the output shaft protrudes from one side of the housing, wherein the motor assembly further comprises a power transfer module connected between the motor and the output shaft, wherein the output shaft is configured to rotate about an axis, and the motor, the power transfer module, and the output shaft are directly on and linearly arranged along the axis.

2. The functional module according to claim 1, wherein the power transfer module comprises a plurality of planetary gear sets; and the planetary gear sets are linearly arranged along the axis.

3. The functional module according to claim 1, wherein the motor, the power transfer module, and the output shaft are linearly arranged along an edge of the housing.

4. An electronic device, comprising:
    a body; and
    a functional module, disposed on the body and comprising:
        a housing;
        a functional member, disposed in the housing; and
        a motor assembly, disposed in the housing and comprising an output shaft,
    wherein the output shaft protrudes from one side of the housing and is fixedly connected to the body to drive the functional module to rotate relative to the body, wherein the motor assembly further comprises a motor and a power transfer module connected between the motor and the output shaft, wherein the motor, the power transfer module, and the output shaft are linearly arranged along and directly next to an edge of the housing.

5. The electronic device according to claim 4,
    wherein the housing is configured to rotate about an axis, and the motor, the power transfer module, and the output shaft are linearly arranged along the axis.

6. The electronic device according to claim 5, wherein the power transfer module comprises a plurality of planetary gear sets, and the planetary gear sets are linearly arranged along the axis.

7. The electronic device according to claim 4, wherein the body comprises a frame, the frame comprises a straight section, and the edge of the housing is collinear with the straight section.

8. The electronic device according to claim 4, further comprising:
    a shaft sleeve, disposed on the body and fixedly sleeved on the output shaft.

\* \* \* \* \*